United States Patent
Zerbarini et al.

(10) Patent No.: US 11,291,158 B2
(45) Date of Patent: Apr. 5, 2022

(54) CROSS-FLOW HORIZONTAL ROTARY MOWER

(71) Applicant: HRM Enterprises, Inc., Westerly, RI (US)

(72) Inventors: Richard Zerbarini, Westerly, RI (US); Paul Zerbarini, Westerly, RI (US); Robert Zerbarini, Westerly, RI (US); David Jalbert, Coventry, RI (US)

(73) Assignee: HRM Enterprises, Inc., Westerly, RI (US)

( * ) Notice: Subject to any disclaimer, the term of this patent is extended or adjusted under 35 U.S.C. 154(b) by 74 days.

(21) Appl. No.: 16/400,651

(22) Filed: May 1, 2019

(65) Prior Publication Data

US 2019/0387674 A1    Dec. 26, 2019

Related U.S. Application Data

(60) Provisional application No. 62/665,131, filed on May 1, 2018.

(51) Int. Cl.
| | | |
|---|---|---|
| *A01D 34/49* | (2006.01) | |
| *A01D 34/47* | (2006.01) | |
| *A01D 75/08* | (2006.01) | |
| A01D 101/00 | (2006.01) | |
| A01D 3/00 | (2006.01) | |

(52) U.S. Cl.
CPC ............. *A01D 34/49* (2013.01); *A01D 34/47* (2013.01); *A01D 75/08* (2013.01); A01D 3/00 (2013.01); A01D 2101/00 (2013.01)

(58) Field of Classification Search
CPC ........ A01D 34/42; A01D 34/43; A01D 34/44; A01D 34/46; A01D 34/52; A01D 34/53
See application file for complete search history.

(56) References Cited

U.S. PATENT DOCUMENTS

| | | | | |
|---|---|---|---|---|
| 2,190,005 | A * | 2/1940 | Basham ................. | A01D 75/08 74/545 |
| 2,619,852 | A * | 12/1952 | McMillan .............. | A01D 75/08 76/82.1 |
| 2,872,222 | A * | 2/1959 | Gohlke .................... | B24B 3/42 403/16 |
| 3,093,951 | A * | 6/1963 | Barows ................ | A01D 34/535 56/294 |
| 3,596,412 | A * | 8/1971 | Brayman ................ | B24B 3/365 451/352 |
| 3,636,666 | A * | 1/1972 | Brayman ................ | B24B 3/368 451/423 |
| 3,673,773 | A * | 7/1972 | Ferguson ............... | A01D 34/42 56/13.3 |

(Continued)

*Primary Examiner* — Alicia Torres
*Assistant Examiner* — Madeline I Runco
(74) *Attorney, Agent, or Firm* — Suiter Swantz pc llo

(57) ABSTRACT

A blade cartridge for a horizontal rotary mower includes airfoil blades and diverter blades that alter airflow within the blade cartridge and prevent grass clippings from accumulating. The horizontal rotary lawnmower may be adapted to engage a cleaning station with brushes or cleaning pads to remove grass clippings while the horizontal rotary lawnmower blade assembly is operated in reverse. The cleaning station may automatically engage a reverse operation. The cleaning station may also hone the blades of the blade assembly while operating in reverse.

20 Claims, 17 Drawing Sheets

(56) References Cited

U.S. PATENT DOCUMENTS

| | | | | |
|---|---|---|---|---|
| 3,678,772 | A * | 7/1972 | Pedersen | A01F 29/22 |
| | | | | 476/16 |
| 3,729,143 | A * | 4/1973 | Wagstaff | A01D 34/52 |
| | | | | 241/282.2 |
| 3,873,038 | A * | 3/1975 | Wagstaff | A01F 29/095 |
| | | | | 241/282.2 |
| 4,109,447 | A * | 8/1978 | Ferguson | A01D 34/49 |
| | | | | 56/13.3 |
| 4,509,316 | A * | 4/1985 | Edwards | B24B 3/365 |
| | | | | 451/423 |
| 4,635,402 | A * | 1/1987 | Sakabe | B24B 3/42 |
| | | | | 451/150 |
| 4,694,613 | A * | 9/1987 | Bernhard | B24B 3/42 |
| | | | | 451/141 |
| 4,746,330 | A * | 5/1988 | Johnson | B24B 3/42 |
| | | | | 451/114 |
| 5,107,566 | A * | 4/1992 | Schmid | A47L 7/04 |
| | | | | 15/328 |
| 5,209,025 | A * | 5/1993 | Martin | A01D 75/08 |
| | | | | 451/193 |
| 6,105,350 | A * | 8/2000 | Vachon | A01D 43/077 |
| | | | | 56/16.6 |
| 6,758,730 | B1 * | 7/2004 | Bernhard | B24B 3/42 |
| | | | | 451/344 |
| 7,797,915 | B1 * | 9/2010 | Kallara | A01D 34/62 |
| | | | | 56/10.2 R |
| 8,348,722 | B2 * | 1/2013 | Arnold | B24D 15/06 |
| | | | | 451/45 |
| 9,491,905 | B2 | 11/2016 | Zerbarini | |
| 9,538,704 | B2 | 1/2017 | Zerbarini | |
| 9,756,781 | B2 | 9/2017 | Zerbarini | |
| 9,907,226 | B2 | 3/2018 | Zerbarini et al. | |
| 10,040,467 | B2 * | 8/2018 | Restall | B62B 3/00 |
| 2005/0036869 | A1 * | 2/2005 | Negranti | B60P 3/07 |
| | | | | 414/537 |
| 2017/0290262 | A1 * | 10/2017 | Zerbarini | A01D 34/90 |

* cited by examiner

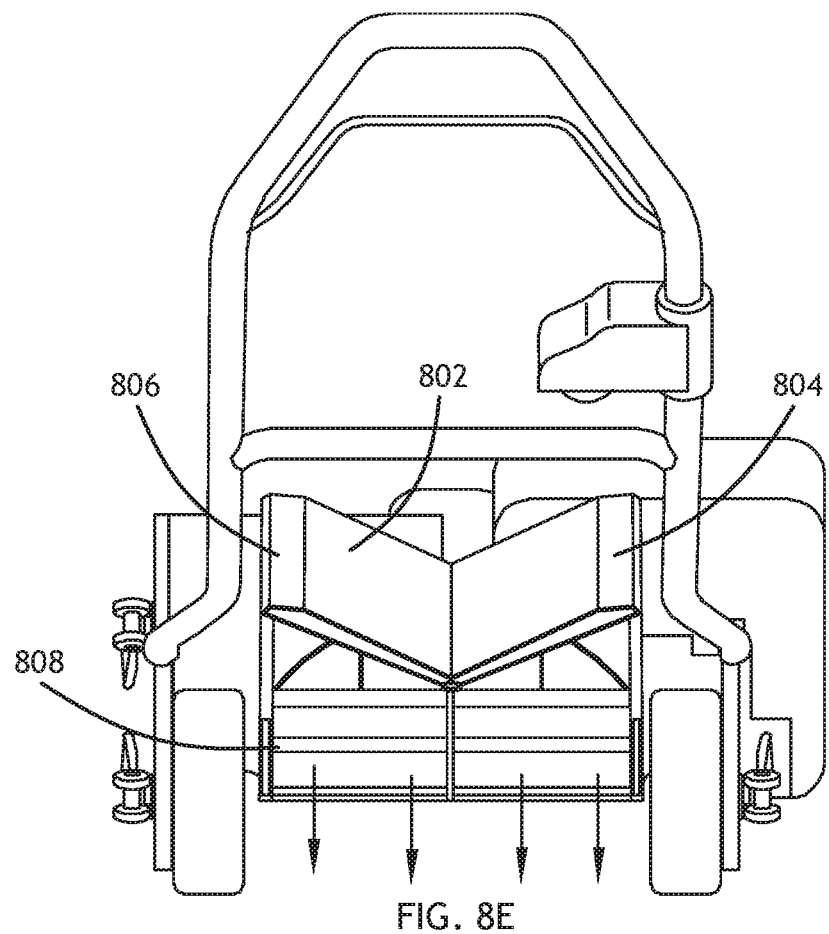

US 11,291,158 B2

CROSS-FLOW HORIZONTAL ROTARY MOWER

PRIORITY

The present application claims the benefit under 35 U.S.C. § 119(e) of U.S. Provisional App. No. 62/665,131 (filed May 1, 2018), which is incorporated herein by reference.

FIELD OF THE INVENTION

Embodiments of the inventive concepts disclosed herein are directed generally toward lawnmowers and more particularly to lawnmower blades and blade housings.

BACKGROUND

Horizontal rotary lawnmowers generally require substantial airflow to carry grass clippings through the lawnmower to an exhaust. The high speed and profile of blades in such a lawnmower mean that fouling from grass clippings has a substantial negative impact on the operational efficiency and cut quality.

Airfoil blades for efficiently moving grass clippings are especially vulnerable to fouling because, in addition to the challenges of straight blades, fouling also compromises the airfoil properties of the blades.

Fouling by grass clippings may accumulate over time, so regular cleaning can help; however regular cleaning can be dangerous due to the sharpness of the blades and general inaccessibility. Furthermore, some cleaning processes risk damage to the cutting edge of the blades which is detrimental to the longevity and operational efficiency of the blades.

It would be advantageous if there were a horizontal rotary lawnmower with a blade system that prevented fouling from grass clippings sticking to the blades, and if there were a cleaning system to safely clean grass clippings from the blades.

SUMMARY

In one aspect, embodiments of the inventive concepts disclosed herein are directed to a blade cartridge for a horizontal rotary mower with airfoil blades and diverter blades that alter airflow within the blade cartridge and prevent grass clippings from accumulating.

In a further aspect, a horizontal rotary lawnmower is adapted to engage a cleaning station with brushes or cleaning pads to remove grass clippings while the horizontal rotary lawnmower blade assembly is operated in reverse.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 8E shows a rear view of a lawnmower according to an exemplary embodiment;

DETAILED DESCRIPTION

Figure 1:
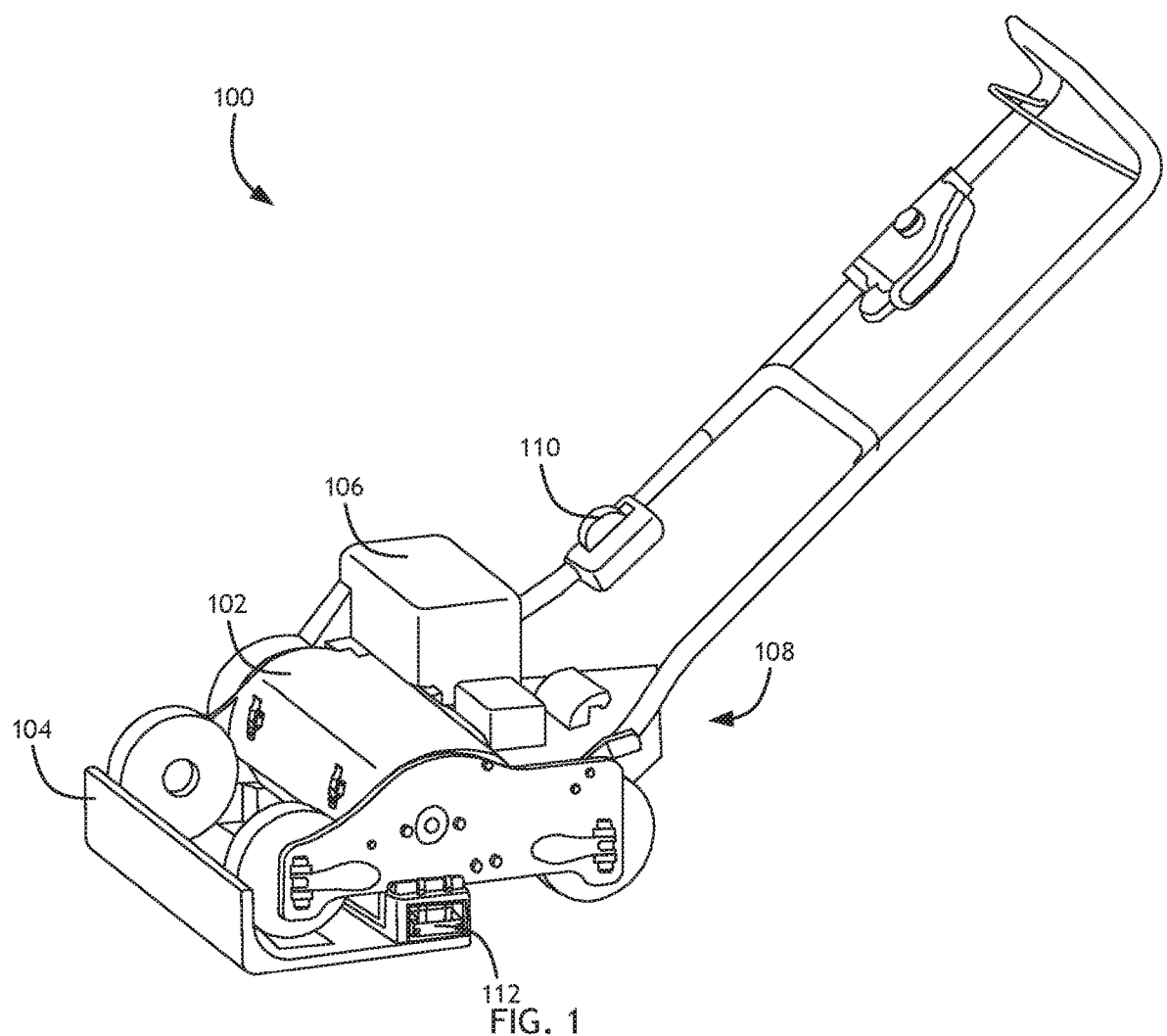
FIG. 1 shows a perspective view of a lawnmower and cleaning station system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Embodiments of the present disclosure may be better understood with reference to U.S. Pat. Nos. 9,491,905; 9,538,704; 9,756,781; and 9,907,226; all of which are hereby incorporated by reference.

Broadly, embodiments of the inventive concepts disclosed herein are directed to a blade cartridge for a horizontal rotary mower with airfoil blades and diverter blades that alter airflow within the blade cartridge and prevent grass clippings from accumulating. A horizontal rotary lawnmower may be adapted to engage a cleaning station with brushes or cleaning pads to remove grass clippings while the horizontal rotary lawnmower blade assembly is operated in reverse.

Referring to FIG. 1, a perspective view of a lawnmower and cleaning station system 100 according to an exemplary embodiment is shown. The lawnmower 102 comprises a horizontal rotary lawnmower having a motor, wheels, processor, and a system of horizontal rotary lawnmower blades in a blade assembly. In at least one embodiment, the horizontal rotary lawnmower blades each comprise an airfoil configured to transit grass clippings toward an exhaust portion 108.

The cleaning station 104 comprises a blade cleaning component (obscured) configured to remove adhering grass clippings from the horizontal rotary lawnmower blades. The cleaning component may be spring biased via a biasing element 112 to provide positive contact with the horizontal rotary lawnmower blades.

In at least one embodiment, the system 100 is configured such that the lawnmower motor 106 operates in reverse during cleaning. By operating in reverse, the blades are cleaning without exposing the cutting edge of each blade to potentially harmful contact with the cleaning component. Furthermore, operating in reverse may be generally more effective because of the shape of the blades.

In at least one embodiment, the lawnmower 102 may operate in reverse automatically when docket in the cleaning station 104. Alternatively, or in addition, the lawnmower 102 may operate in reverse via manual controls 110. The manual controls 110 may also adjust blade RPM to suit grass cutting conditions (dry & wet). Power consumption in such a machine is primarily a function of air flow, not cutting load.

Figure 2:
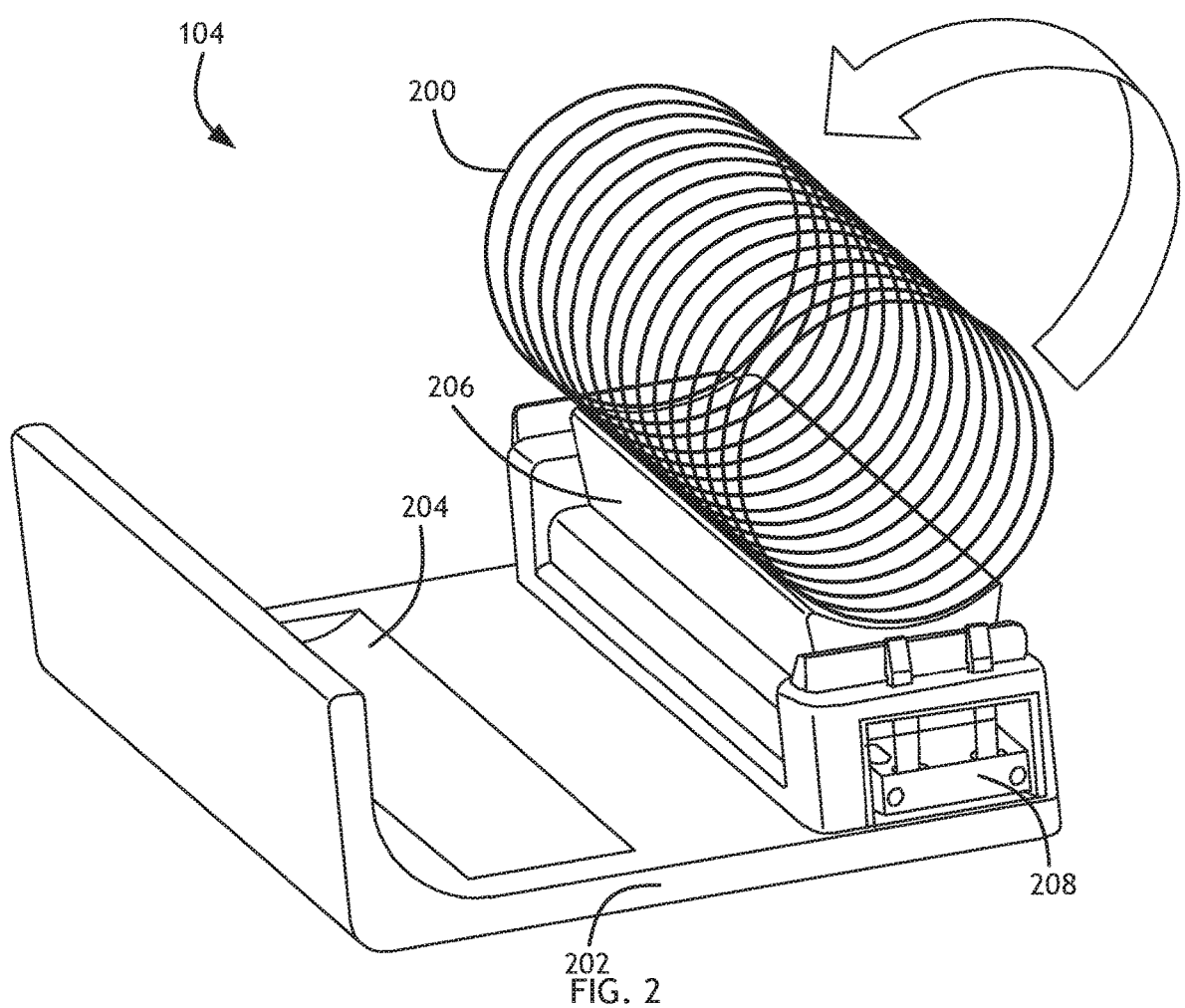
FIG. 2 shows a perspective view of a cleaning station according to an exemplary embodiment.

Referring to FIG. 2, a perspective view of a cleaning station 104 according to an exemplary embodiment is shown. The cleaning station 104 cleans and potentially hones blades in a horizontal rotary blade assembly 200. The cleaning station 104 comprises a body 202 that defines wheel recess 204. The wheel recess 204 defines a location for a set of wheels on a corresponding lawnmower such that when the wheels are in the when recess 204, the horizontal rotary blade assembly 200 is placed in a particular location relative to a cleaning apparatus 206, In at least one embodiment, the cleaning apparatus 206 generally conforms to the shape of the horizontal rotary blade assembly 200, with a curved cleaning surface. Furthermore, the cleaning apparatus 206 may be a size generally corresponding to a blade opening in the bottom of the lawnmower housing such that, when the lawnmower is cleaning station 104, the blades are completely covered by the lawnmower housing and the cleaning apparatus 206. Completely covering the blades provides additional safety by preventing incidental contact with the blades, and prevents incidental damage to the blades.

In at least one embodiment, the cleaning station 104 includes spring biasing elements to maintain positive contact between the cleaning apparatus 206 and the horizontal rotary blade assembly 200, even as the cleaning apparatus 206 is worn down over time. The cleaning station 104 may also include securing elements 208 to engage the lawnmower. The securing element 208 may hold the lawnmower in place laterally and prevent relative movement between the lawnmower and the cleaning station 104 to prevent damage to the blades during a cleaning cycle. In at least one embodiment, the securing elements 208 also automatically engage specific functionality of the lawnmower; for example, the securing elements 206 may automatically trigger a cleaning cycle so that the lawnmower begins a short reverse operation.

Figure 3:
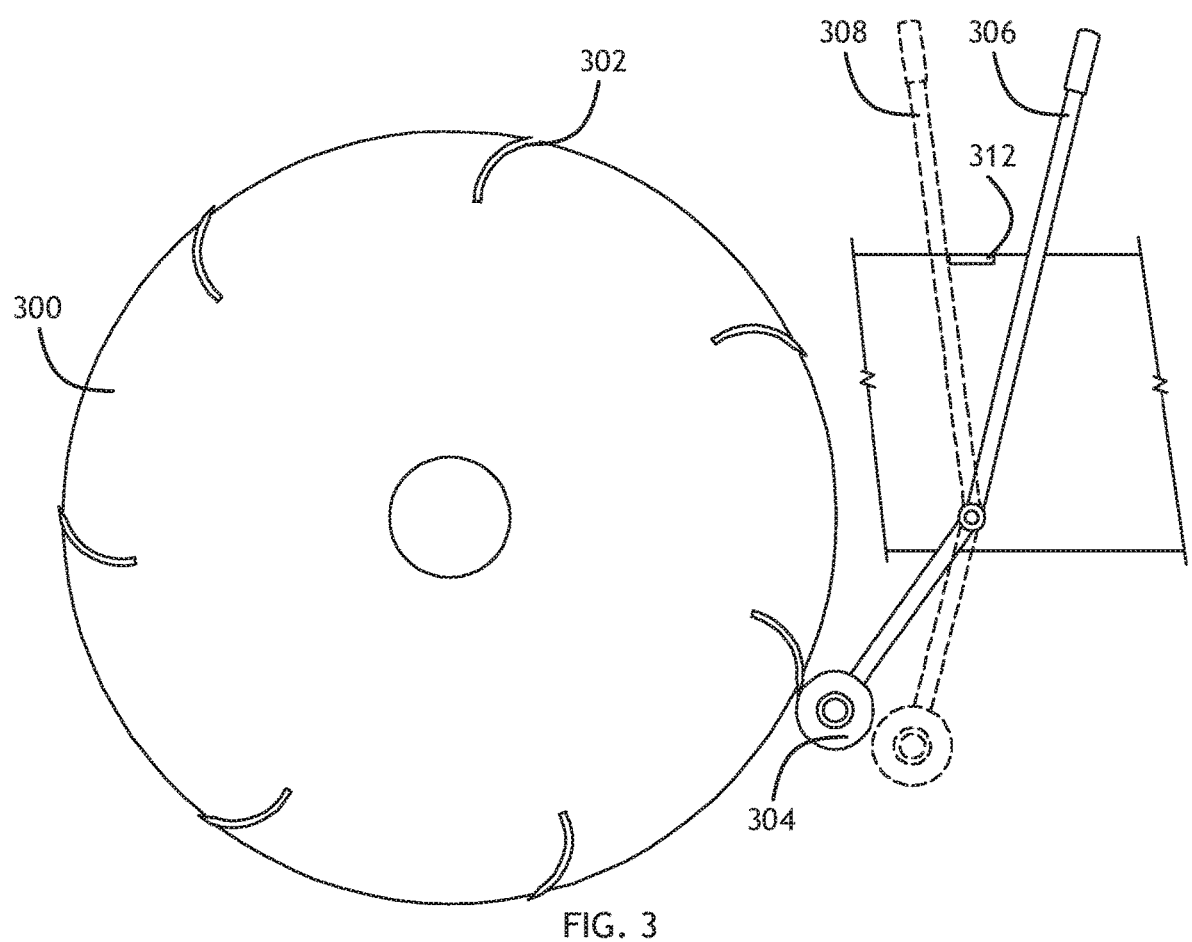
FIG. 3 shows a side view of a cleaning/honing mechanism according to an exemplary embodiment.

Referring to FIG. 3, a side view of a cleaning/honing mechanism according to an exemplary embodiment is shown. In a horizontal rotary blade assembly 300 having a plurality of airfoil blades 302 with cutting edges orientated in a direction of rotation, the cutting edges may need to be periodically cleaned and honed to preserve cutting quality.

In at least one embodiment, a honing element 304 is disposed on a deflectable armature 306, 308. In an active orientation, the deflectable armature 306 places the honing element 304 in contact with the cutting edge of the airfoil blades 302; while in an inactive orientation, the deflectable armature 308 disengages the honing element 304 form the airfoil blades 302. A retention element 312 may define a maximum and/or minimum deflection for the deflectable armature 306, 308, and retain the deflectable armature 306, 308 in the inactive orientation when not in use.

Figure 4:
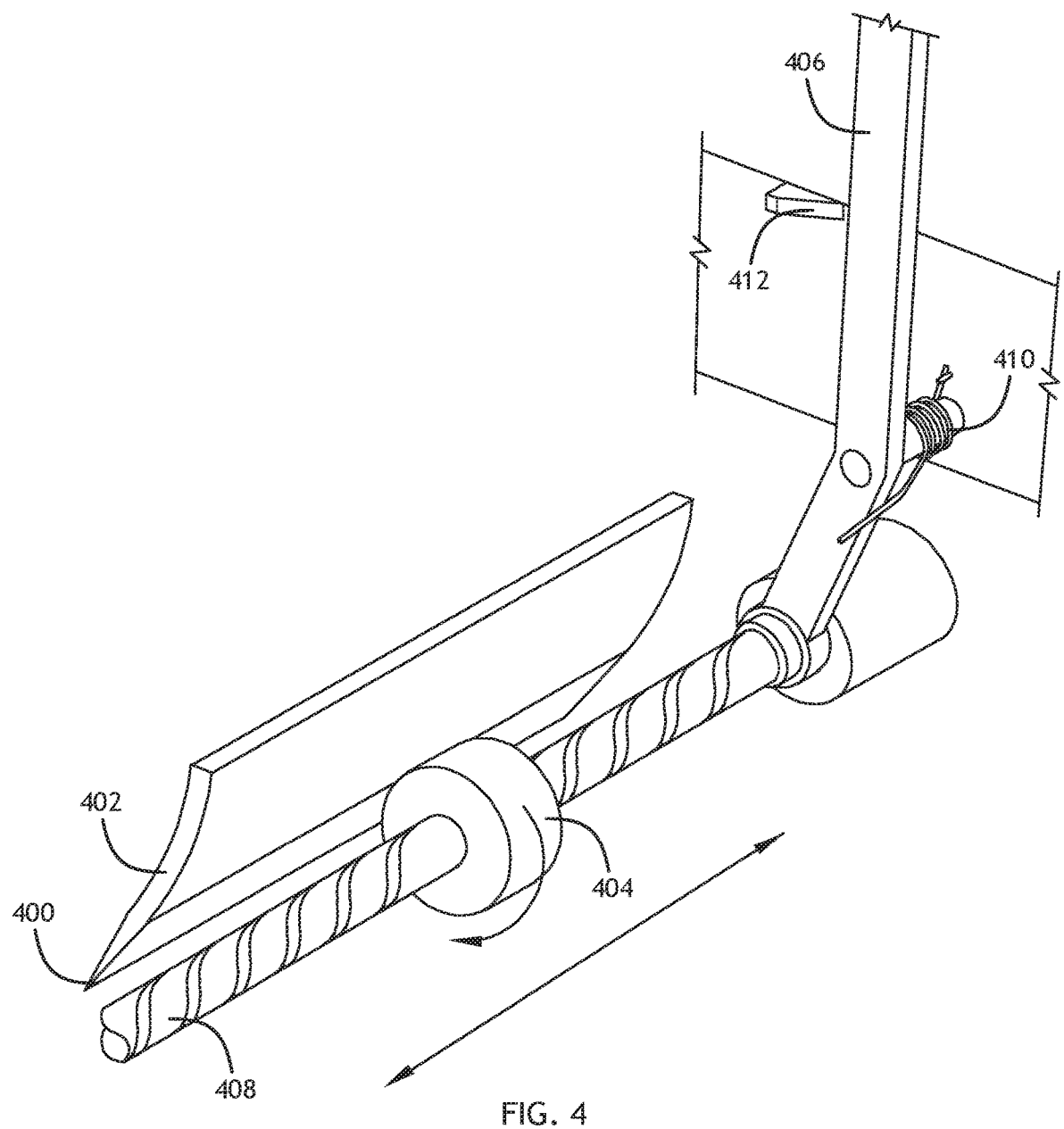
FIG. 4 shows a perspective view of a cleaning/honing mechanism according to an exemplary embodiment.

Referring to FIG. 4, a perspective view of a cleaning/honing mechanism according to an exemplary embodiment is shown. A cleaning/honing mechanism for honing the cutting edge 400 of an airfoil blade 402, such as in FIG. 3, includes a honing element 404 disposed on an armature 406. The honing element 404 is driven along the length of the cutting edge 400 by a linear motion element 408 such as a lead screw, ball screw, or cable driven slider component. In at least one embodiment, the linear motion element 408 may also rotate the honing element 404 in a desired direction while moving linearly.

In at least one embodiment, the armature 406 is spring biased 410 to maintain contact with the cutting edge 400.

When inactive, the armature may be held in an inactive orientation by a retention element 412.

Cleaning/honing systems such as in FIGS. 3 and 4 may be disposed within the housing of a horizontal rotary mower and utilize the power from the mowers drive train to actuate the linear motion element 408. Such a mower may have mechanisms for retaining a blade assembly at predetermined angular locations corresponding to an intersection between a cutting edge 400 and the honing element 404 when in use. For example, a manual control may be required to engage the honing element 404; such manual control may simultaneously engage a clutch that disengages the blade assembly from the power train and locks the blade assembly in one of a set of specific orientations.

Alternatively, the cleaning/honing system may be disposed in a separate cleaning station. Such cleaning station may include automatic elements to disengage a blade assembly from its power train or otherwise lock the blade assembly in one of a set of desired orientations. The cleaning station may be separately powered or utilize battery power from the lawnmower. The cleaning station may also implement an automatic cycle of honing a cutting edge 400, then rotating the blade assembly to another orientation in the set of desired orientations until all of the cutting edges 400 are processed. In such a system, the armature may be disposed to raise the honing element 404 from a button surface of the cleaning station and engage the cutting edges through an opening in the bottom of the lawnmower.

Figure 5:
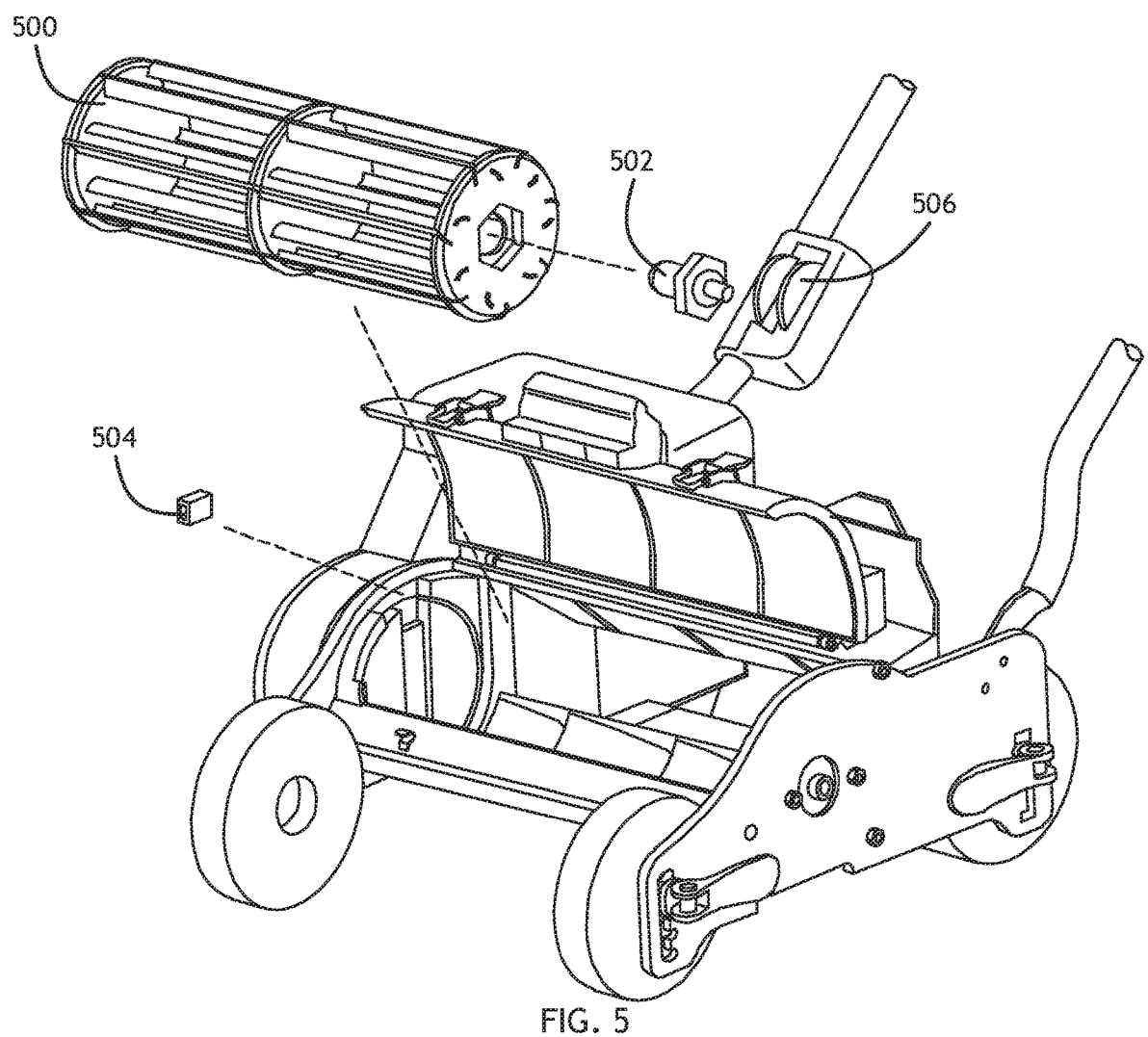
FIG. 5 shows a perspective view of a lawnmower with a replaceable blade assembly according to an exemplary embodiment.

Referring to FIG. 5, a perspective view of a lawnmower with a replaceable blade assembly 500 according to an exemplary embodiment is shown. In at least one embodiment, the replaceable blade assembly 500 utilizes blade assembly adapting and locking components 502, 504 to engage the blade assembly 500 to a drive train in the mower and retain the blade assembly 500 within the mower housing. In at least one embodiment, manual controls 506 may disengage the blade assembly 500 for replacement.

Figure 6:
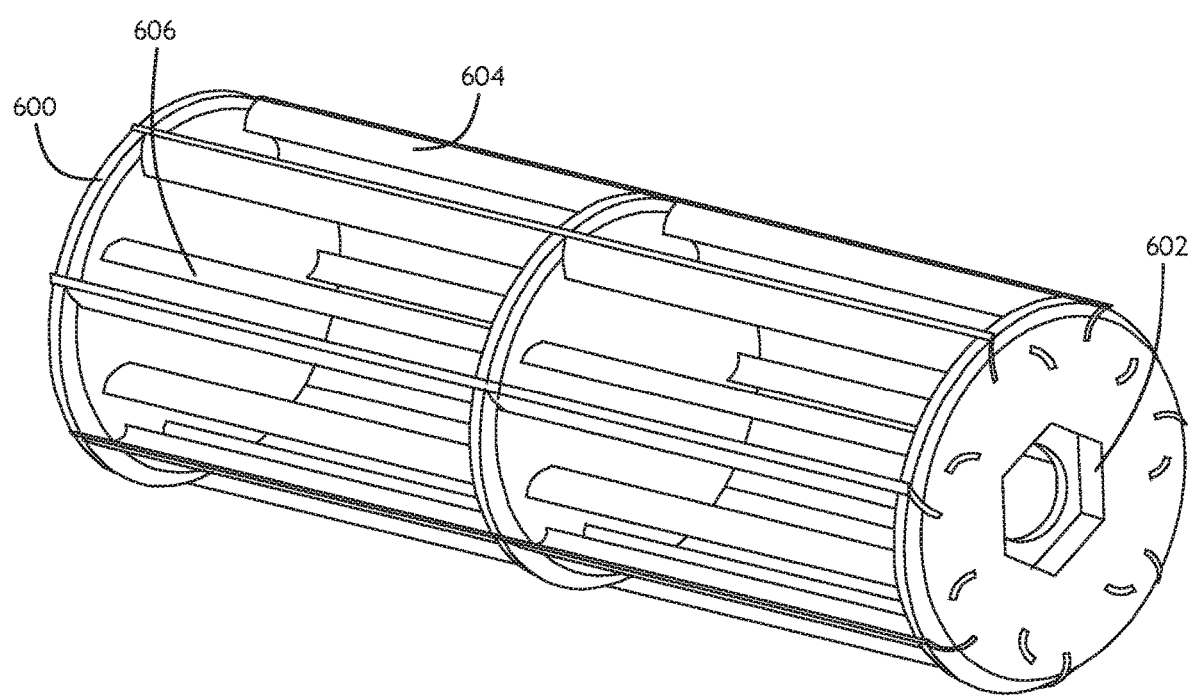
FIG. 6 shows a perspective view of a blade assembly according to an exemplary embodiment.

Referring to FIG. 6, a perspective view of a blade assembly 600 according to an exemplary embodiment is shown. The blade assembly 600 defines one or more drive train engaging portions 602 that allow the blade assembly 600 to engage the lawnmower drive train and receive a rotational force from the drive train. The drive train engaging portions 602 may be shaped corresponding to the number of cutting blades 604 in the blade assembly 600 such that a processor in the lawnmower may identify the relative angular position of the blade assembly 600 such that the lawnmower can accurately position cutting blades 604 with respect to a separate cleaning station or cleaning/honing element.

In at least one embodiment, a lawnmower with such a blade assembly 600 may be configured to automatically operate the blade assembly in reverse every time the motor is started to at least partially remove any clippings stuck to the cutting blades 604.

Cutting blade thickness is generally less than 1.9 millimeters (0.075 inches); thin cutting blades 604 enhance edge life longevity. Even thinner blades, for example 0.81 to 0.89 millimeters (0.032 to 0.035 inches) were tested in prototypes and yielded a sharper cutting edge than a typical slightly used rotary mower blade even when unsharpened.

The cutting edge of the cutting blades 604 may be hardened to greater than RC 60 to a depth of less than 0.889 millimeters (0.035 inches). The cutting blade body is softer with RC less than 58. A softer body may withstand impacts. Furthermore, the curved airfoil cutting blade 604 provides structural rigidity and is less prone to bending.

In at least one embodiment, the blades assembly 600 includes a plurality of diverter blades 606. The diverter blades 606 alter air flow within the blade assembly 600 to prevent clumping around the cutting blades 604.

Figure 7:
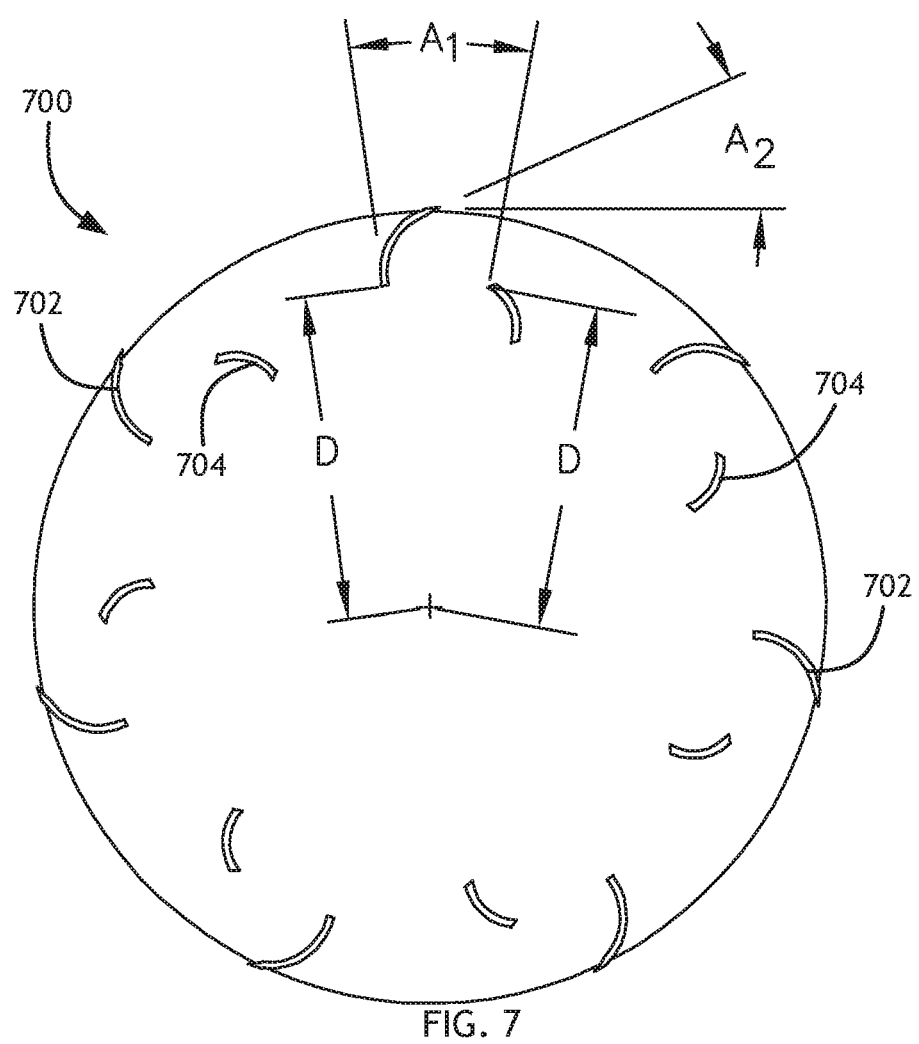
FIG. 7 shows a side view of a blade assembly according to an exemplary embodiment.
Figure 8A:
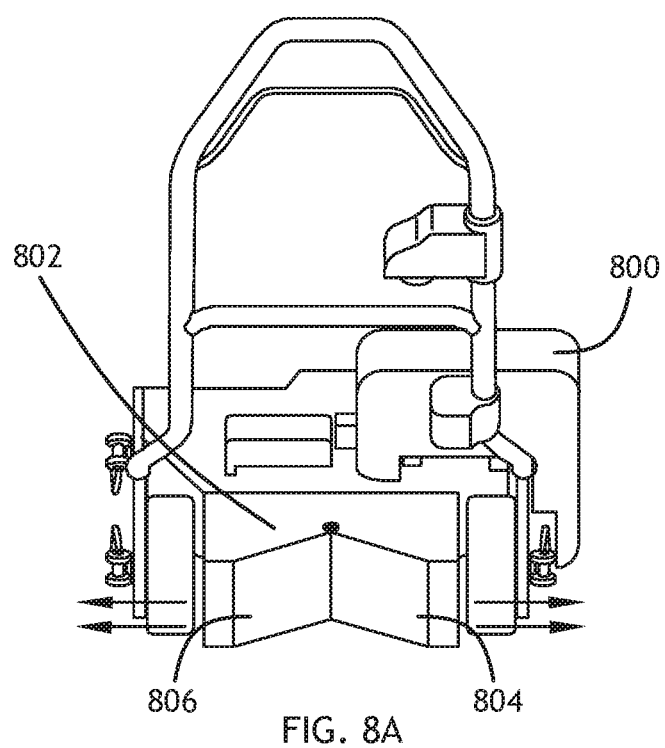
FIG. 8A shows a rear view of a lawnmower according to an exemplary embodiment.
Figure 8B:
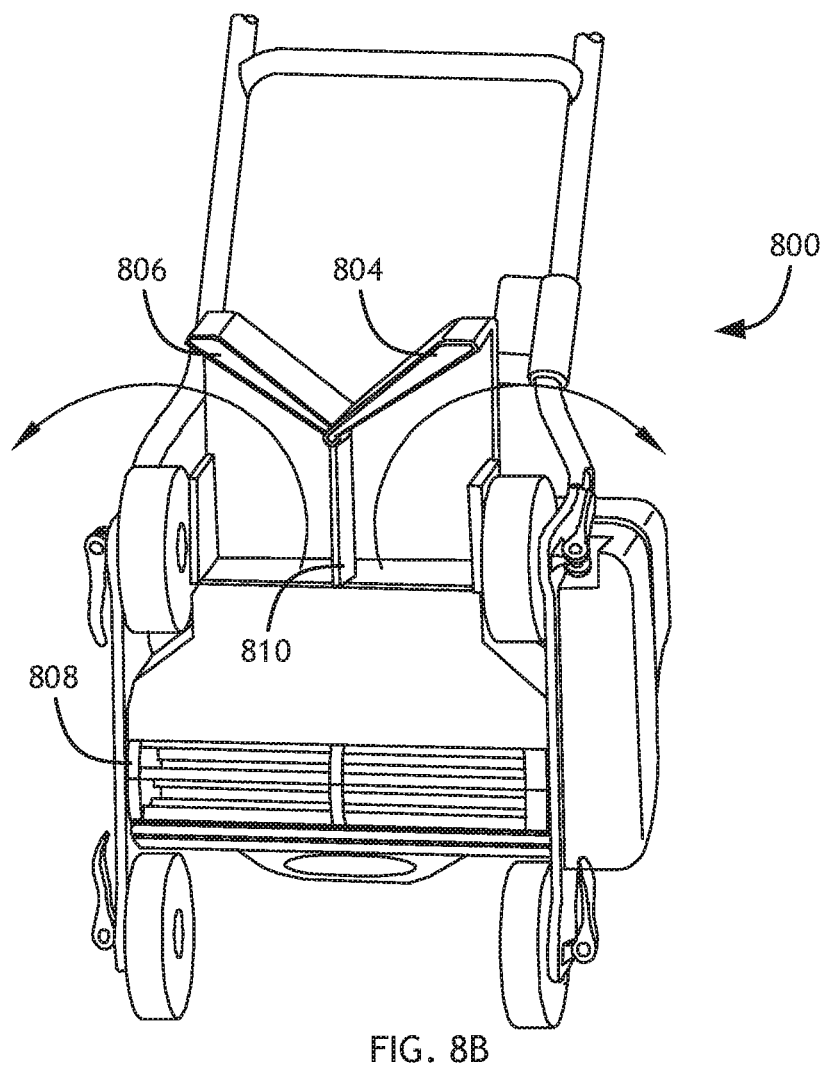
FIG. 8B shows a bottom view of a lawnmower according to an exemplary embodiment.
Figure 8C:
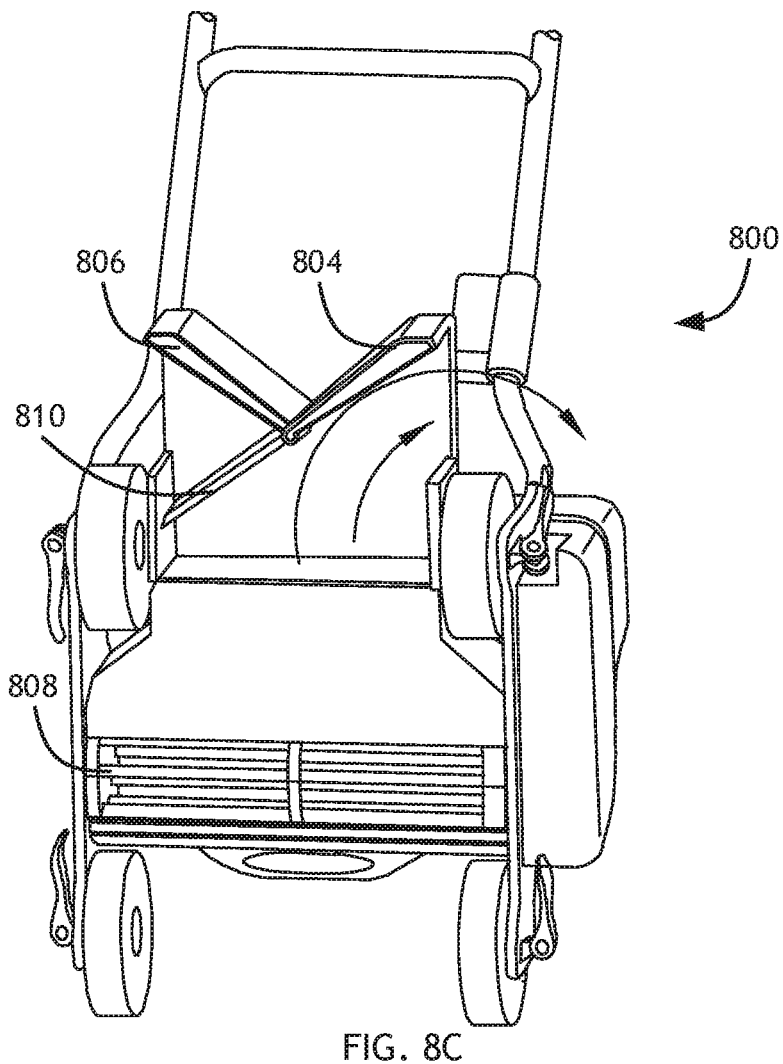
FIG. 8C shows a bottom view of a lawnmower according to an exemplary embodiment.
Figure 8D:
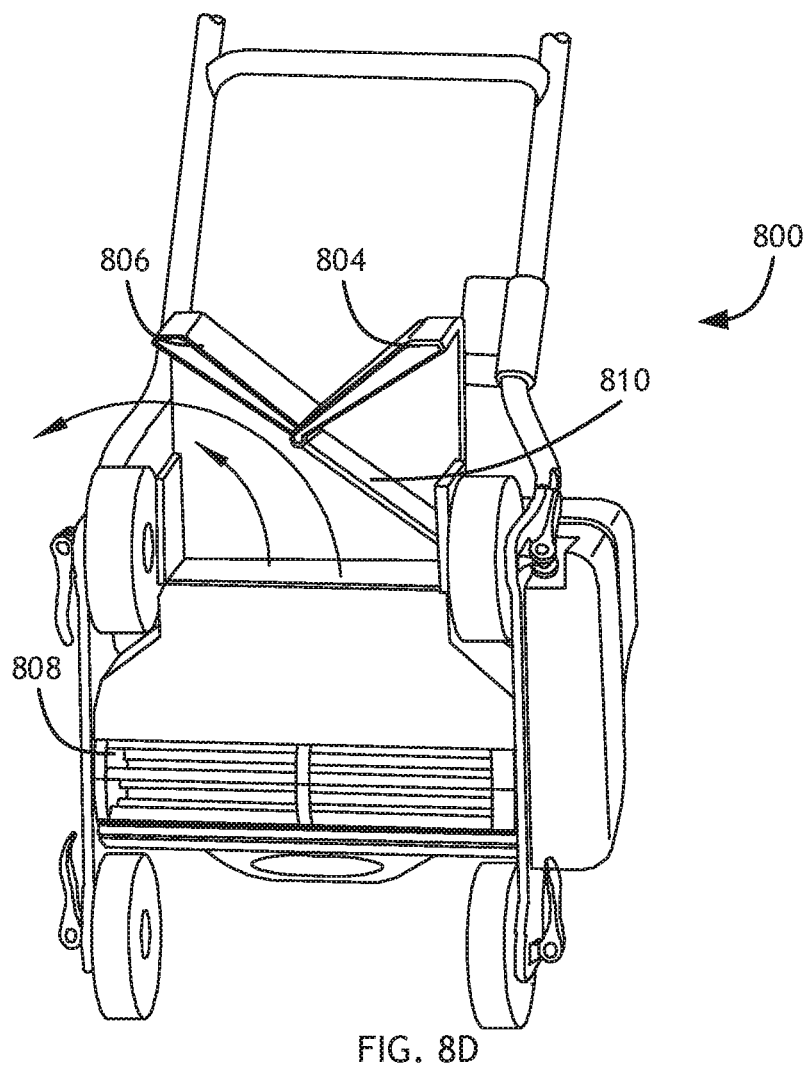
FIG. 8D shows a bottom view of a lawnmower according to an exemplary embodiment.
Figure 8F:
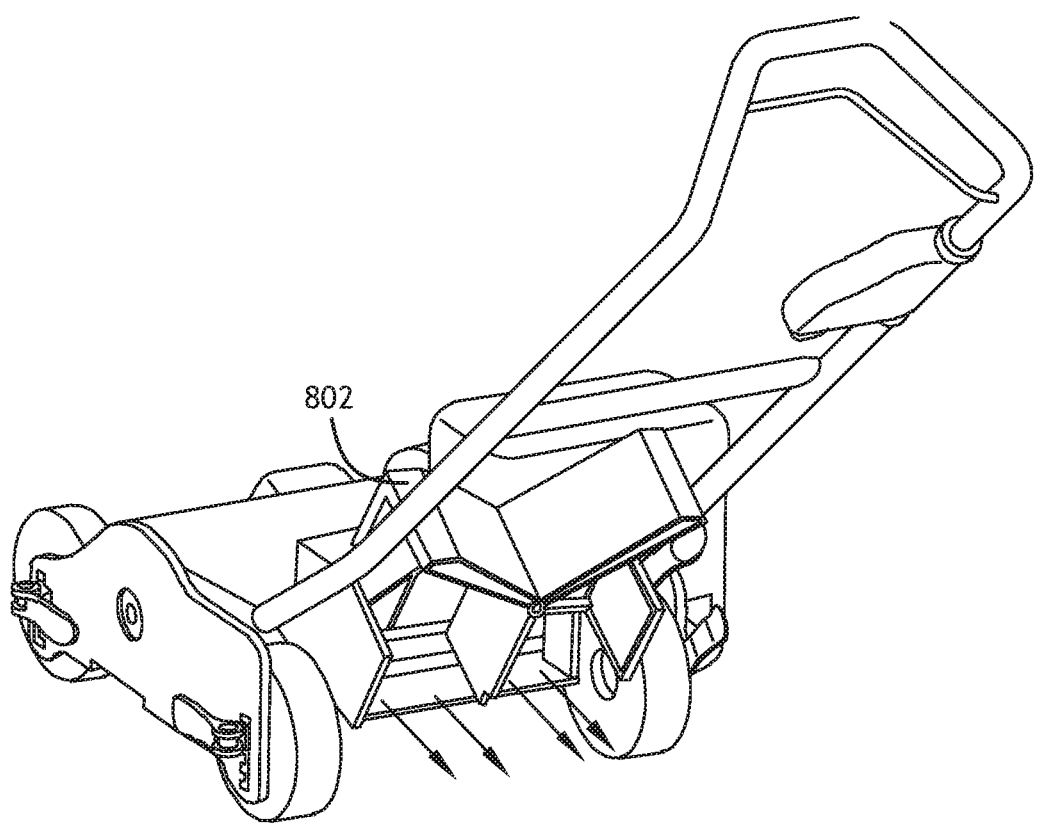
FIG. 8F shows a rear perspective view of a lawnmower according to an exemplary embodiment.

Referring to FIG. 7, a side view of a blade assembly 700 according to an exemplary embodiment is shown. In a blade assembly 700 with a plurality of cutting blades 702 and diverter blades 704, the diverter blades 704 may be configured to prevent grass clips from clumping around the cutting blades 702. In at least one embodiment, each cutting blade 702 is associated with a diverter blade 704. The diverter blades 704 may have opposite angular curvature as compared to the corresponding cutting blade 702; that is to say as the distance from the center of rotation increase, the curvature of the cutting blade 702 is toward the direction of rotation and the curvature of the diverter blade 704 is away from the direction of rotation.

In at least one embodiment, the distance from the center of rotation to a proximal edge of the cutting blade 702 is substantially similar to the distance from the center of rotation to a distal edge of the corresponding diverter blade 704 (the distance D). In at least one embodiment, the angular distance of the diverter blade 704 from the cutting blade 702 ($A_1$) as measured from the center of rotation may be a function of the front angle of the cutting blade ($A_2$).

In at least one embodiment, cutting blades 702 with a front angle between 26 and 33 degrees demonstrated good cut quality and good anti-sticking characteristics. Furthermore, anti-sticking characteristics are best with a rear angle between 85 and 95 degrees.

In at least one embodiment, a cutting blade 702 front angle of 33 degrees with a corresponding diverter blade 704 may be optimal. Cut quality may be suboptimal with a front angle greater than 35 degrees or less than 23 degrees.

Referring to FIGS. 8A-8F, views of a lawnmower 800 according to an exemplary embodiment are shown. The lawnmower 800 includes a ducting exhaust 802 with two outlets 804, 806 disposed in the exhaust path of a rotary blade assembly 808. A first outlet 804 may direct exhaust clippings to the right while a second outlet 806 may direct exhaust clippings to the left.

In at least one embodiment, an exhaust diverter 810 within the ducting exhaust 802 may be positioned to divert grass clippings to one or both of the outlets 804, 806. For example, in a first orientation (such as in FIG. 8C), the exhaust diverter 810 directs the grass clippings toward the first outlet 804. In a second orientation (such as in FIG. 8D), the exhaust diverter 810 directs the grass clippings toward the second outlet 806

In at least one embodiment (such as in FIGS. 8E and 8F), the entire ducting exhaust 802 may be raised such that grass clippings are directed behind the lawnmower 800.

Figure 9A:
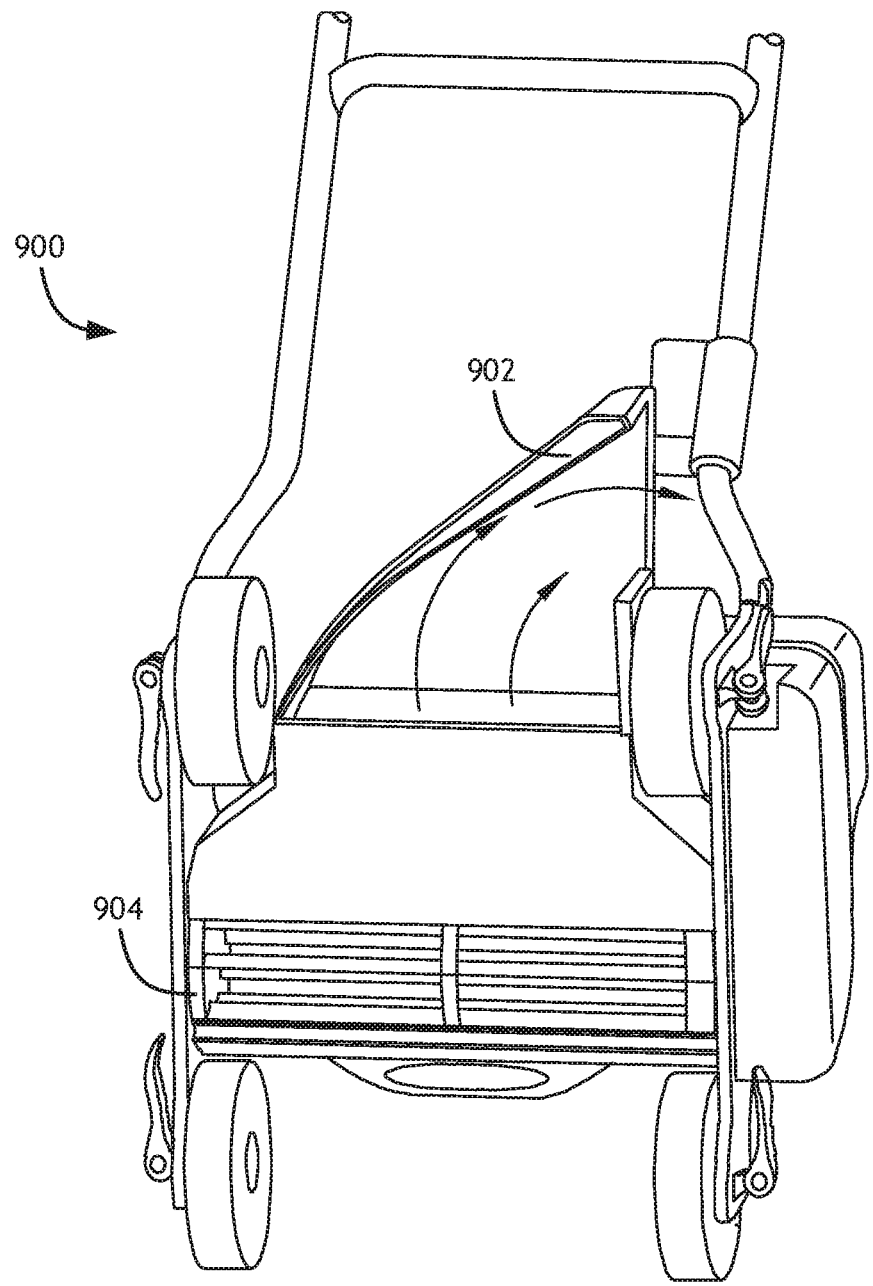
FIG. 9A shows a bottom view of a lawnmower according to an exemplary embodiment.
Figure 9B:
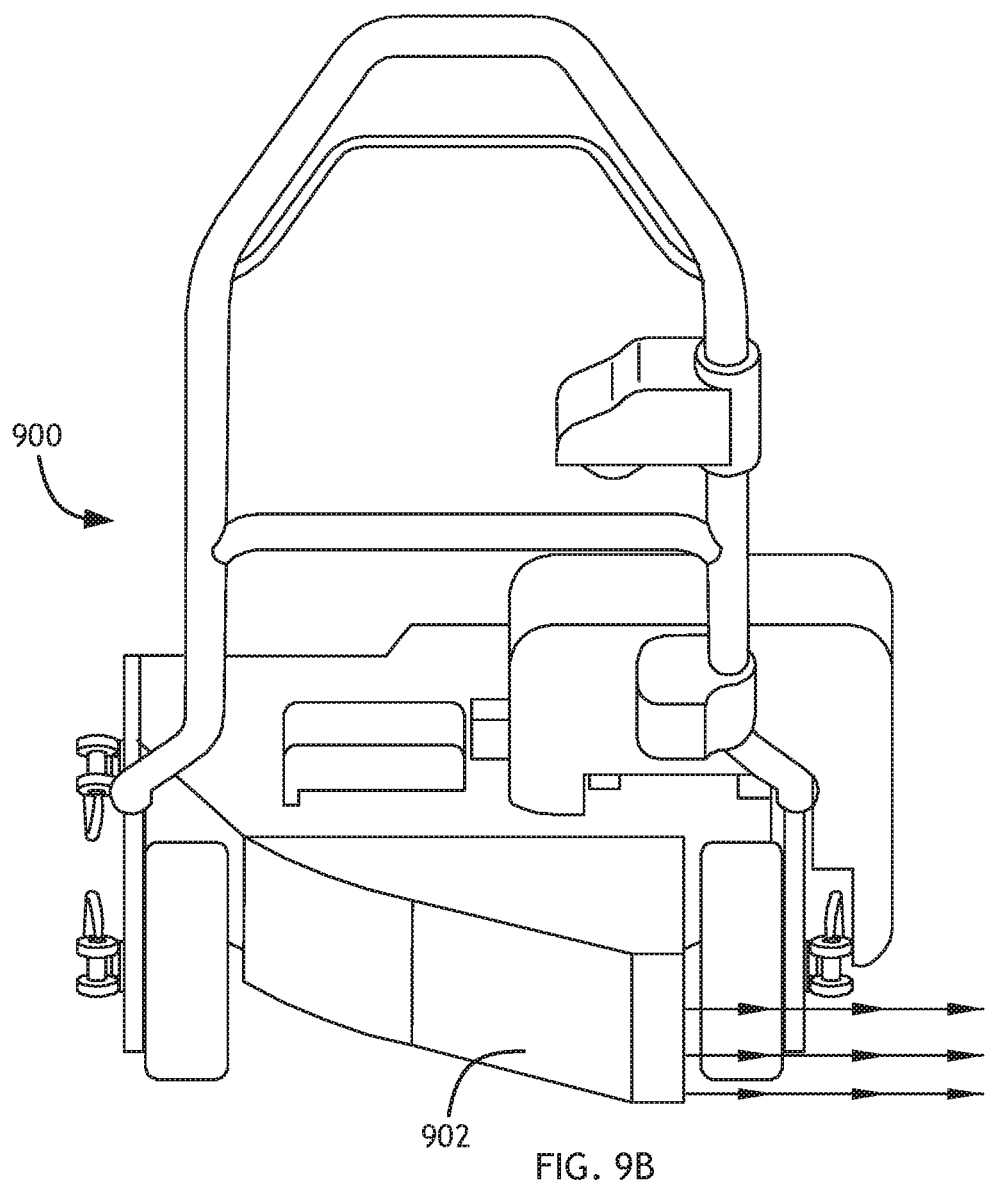
FIG. 9B shows a rear view of a lawnmower according to an exemplary embodiment.

Referring to FIGS. 9A-9B, views of a lawnmower 900 according to an exemplary embodiment are shown. A dedicated exhaust 902 is configured to divert grass clippings from a rotary blade assembly 904.

In embodiments such as in FIGS. 8A-9B, where the rotary blade assembly 808, 904 comprises airfoil blades, the air flow is designed to generally direct grass clippings from the cutting area to a rear exhaust port. A rear mounted exhaust 802, 902 is therefore needed to direct grass clippings away from the user in walk behind embodiments.

In at least one embodiment, the rear mounted exhaust 802, 902 may define a rear discharge bottom panel. The rear bottom is required when cutting thin dry grass due to excessive reverse air flow. In some conditions, the rear discharge bottom panel may collect wet clippings. Allowing the rear discharge bottom panel to be removed may cause backflow. In at least one embodiment, the rear discharge bottom panel may be converted to a flap perpendicular to the ground to prevent backflow, and prevent wet clippings from accumulating.

Figure 10A:
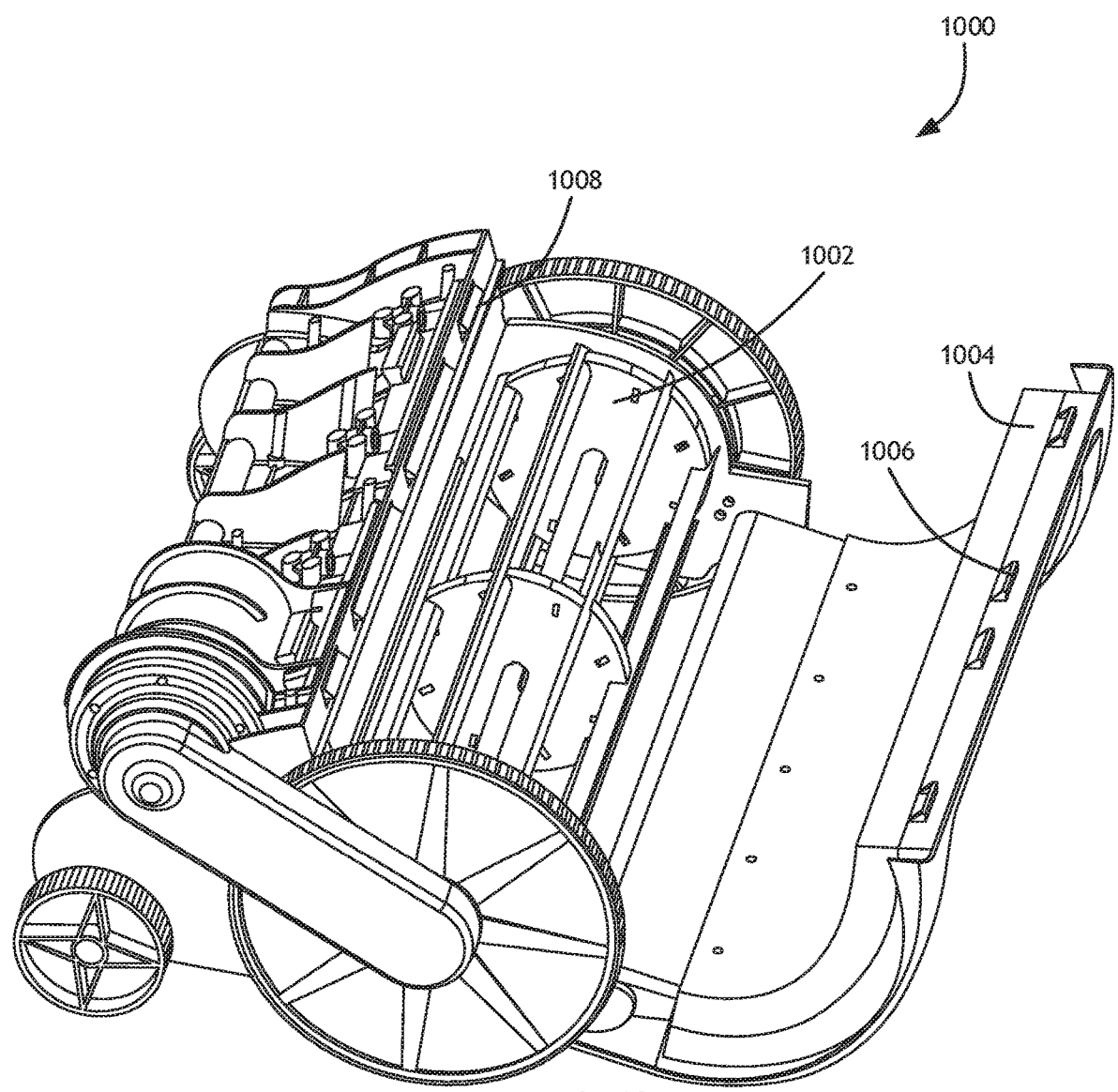
FIG. 10A shows a perspective view of a lawnmower housing and blade assembly according to an exemplary embodiment.
Figure 10B:
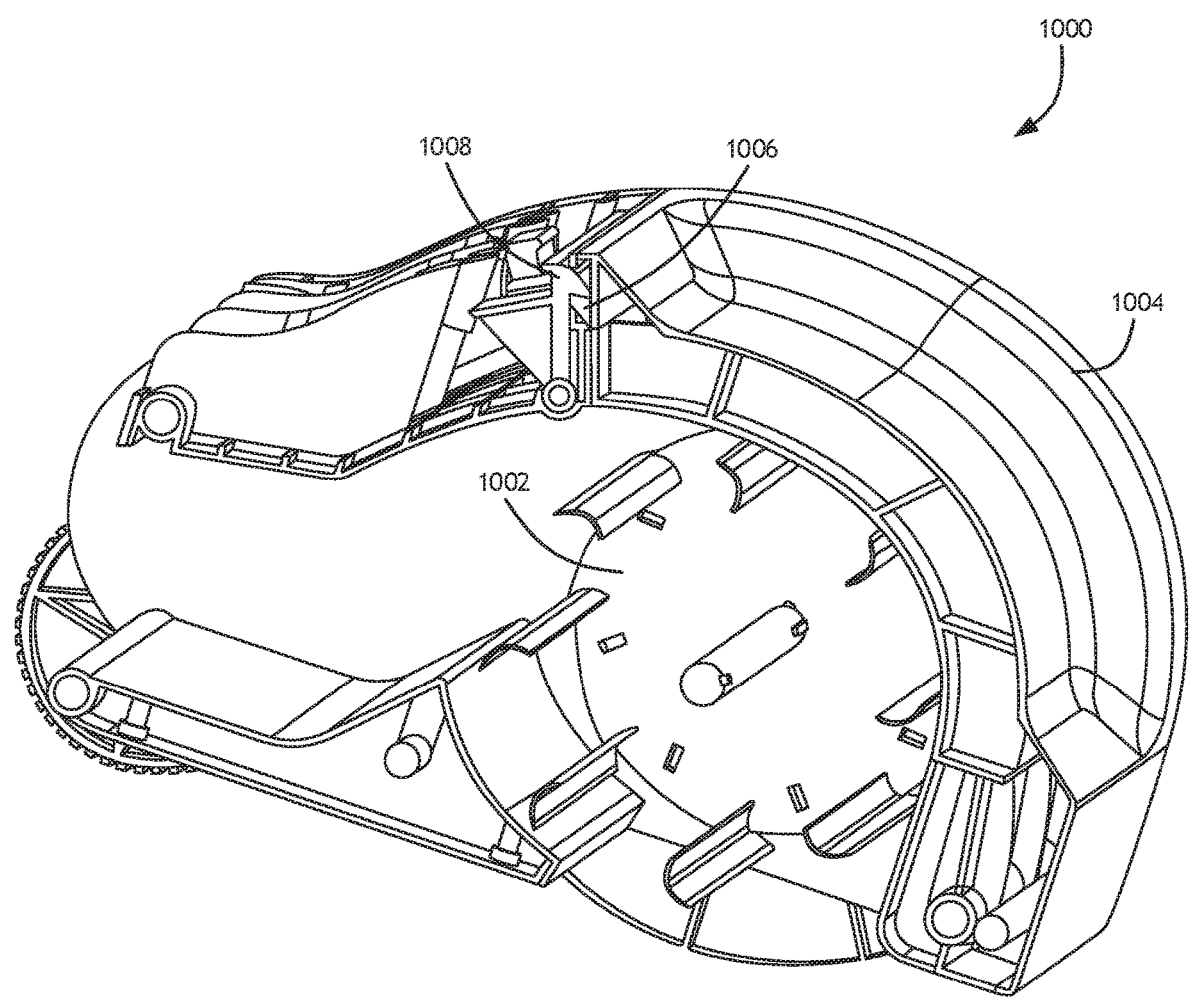
FIG. 10B shows a partial perspective view of a lawnmower housing and blade assembly according to an exemplary embodiment.

Referring to FIG. 10A-10B, perspective and partial views of a lawnmower housing 1000 and blade assembly 1002 according to an exemplary embodiment are shown. The housing 1000 includes an access portion 1004 configured to conform to the shape of the blade assembly 1002 to create or enhance airflow characteristics of the housing 1000. The access portion 1004 allows the blade assembly 1002 to be removed and replaced periodically.

The access portion 1004 includes catch elements 1006 configured to engage latch elements 1008 in the housing 1000. In at least one embodiment, the latch elements 1008 include or are configured to actuate one or more switches such that when the access portion 1004 is open, the blade assembly is disengaged from a drive train for replacement or otherwise locked to prevent the blade assembly 1002 from rotating.

Lawnmowers according to the described embodiments provide healthier and greener grass, clean cut without tearing, have a smaller footprint, are lighter and more maneuverable, are safer due to slower blade tip speed and reduced opening size for cutting, are easier to maintain with disposable blade cartridges, and are easier to use do to non-clumping discharge characteristics.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A lawnmower comprising:
a housing;
a plurality of wheels disposed on the housing;
a motor; and
a blade assembly connected to the motor configured to rotate about an axis parallel to a surface being mowed, the blade assembly comprising:
a plurality of cutting blades, each cutting blade fixed at an orientation relative to the axis, each cutting blade defining an airfoil to produce a cross-flow for transiting grass clippings and disposed a first distance from the axis; and
a plurality of diverter blades, each diverter blade fixed at an orientation relative to the axis, each of the plurality of diverter blades associated with a cutting blade and disposed a second distance from the axis less than the first distance,
wherein each of the plurality of diverter blades are configured to alter a cross-flow within the blade assembly to prevent the grass clippings from sticking to the plurality of cutting blades.

2. The lawnmower of claim 1, wherein:
each of the plurality of cutting blades has a front angle between 26° and 33°.

3. The lawnmower of claim 1, wherein:
each of the plurality of cutting blades has a back angle between 85° and 95°.

4. The lawnmower of claim 1, wherein:
each of the plurality of diverter blades comprises an airfoil with opposite curvature as compared to the associated cutting blade.

5. The lawnmower of claim 1, further comprising a processor configured to:
receive a signal to power the motor;
operate the motor in a reverse direction for a defined period of time to remove any stuck grass clippings from the cutting blades; and
operate the motor in an operative direction.

6. The lawnmower of claim 1, further comprising a cleaning and honing mechanism comprising:
a deflectable armature disposed on an internal surface of the housing; and
a cleaning and honing element disposed on the deflectable armature.

7. The lawnmower of claim 6, wherein the cleaning and honing mechanism further comprises a linear motion element connected to the armature, wherein the cleaning and honing element is configured to moveable engage the linear motion element.

8. A system comprising:
a lawnmower comprising:
a housing;
a plurality of wheels disposed on the housing;
a motor; and
a blade assembly connected to the motor configured to rotate about an axis parallel to a surface being mowed, the blade assembly comprising:
a plurality of cutting blades, each cutting blade fixed at an orientation relative to the axis, each cutting blade defining an airfoil to produce a cross-flow for transiting grass clippings and disposed a first distance from the axis; and
a plurality of diverter blades, each diverter blade fixed at an orientation relative to the axis, each of the plurality of diverter blades associated with a cutting blade and disposed a second distance from the axis less than the first distance,
wherein each of the plurality of diverter blades are configured to alter a cross-flow within the blade assembly to prevent the grass clippings from sticking to the plurality of cutting blades; and
a cleaning station comprising:
a cutting blade cleaning element; and
at least one wheel recess,
wherein the at least one wheel recess is disposed such that when corresponding wheels of the lawnmower engage the at least one wheel recess, the blade assembly is disposed at an operative location relative to the cutting blade cleaning element.

9. The system of claim 8, wherein:
the cutting blade cleaning element is spring biased to maintain positive contact with the blade assembly.

10. The system of claim 8, wherein:
the cleaning station further comprises one or more securing elements configured to releasably engage the housing of the lawnmower and hold it in a defined position and orientation.

11. The system of claim 10, wherein:
the lawnmower further comprises a processor configured to:
  detect that the securing elements have engaged the housing; and
  operate the motor in a reverse direction for a defined period of time.

12. The system of claim 8, wherein the cutting blade cleaning element comprises a brush.

13. The system of claim 8, wherein the cutting blade cleaning element conforms to a size and shape of a cutting opening defined by the housing such that when the lawnmower is positioned in the cleaning station, the blade assembly is completely inaccessible.

14. A lawnmower comprising:
a housing;
a plurality of wheels disposed on the housing;
a motor; and
a blade assembly connected to the motor configured to rotate about an axis parallel to a surface being mowed, the blade assembly comprising:
  a plurality of cutting blades, each having a front angle between 26° and 33° and a back angle between 85° and 95°, each cutting blade defining an airfoil to produce a cross-flow for transiting grass clippings, wherein a proximal edge of each cutting blade is disposed a first distance from the axis; and
  a plurality of diverter blades, each of the plurality of diverter blades defining an airfoil, each of the plurality of diverter blades associated with a cutting blade, wherein a distal edge of each diverter blade is disposed the first distance from the axis,
wherein each of the plurality of diverter blades are configured to alter a cross-flow within the blade assembly to prevent the grass clippings from sticking to the plurality of cutting blades.

15. The lawnmower of claim 14, further comprising a processor configured to:
  receive a signal to power the motor;
  operate the motor in a reverse direction for a defined period of time to remove any stuck grass clippings from the cutting blades; and
  operate the motor in an operative direction.

16. The lawnmower of claim 14, further comprising a cleaning and honing mechanism comprising:
  a deflectable armature disposed on an internal surface of the housing; and
  a cleaning and honing element disposed on the deflectable armature.

17. The lawnmower of claim 16, wherein the cleaning and honing mechanism further comprises a linear motion element connected to the armature, wherein the cleaning and honing element is configured to moveable engage the linear motion element.

18. The lawnmower of claim 14, further comprising a rear mounted exhaust portion comprising an exhaust diverter configured for transition between a first orientation wherein grass clippings are diverted to a left side exhaust, a second orientation wherein grass clippings are diverted to a right side exhaust, and a third orientation wherein grass clippings are slit between the left side exhaust and right side exhaust.

19. The lawnmower of claim 18, wherein the rear mounted exhaust portion is configured to be placed in a raised orientation.

20. The lawnmower of claim 18, wherein the rear mounted exhaust portion comprises a discharge bottom panel configured to for transition from a first orientation substantially parallel to the surface being cut to a second orientation substantially perpendicular to the surface being cut.

* * * * *